SSB-FM DETECTOR

Filed Jan. 21, 1963

INVENTORS
SAMUEL L. BROADHEAD JR.
DENNIS L. FREDRICKSON
RUSSELL G. VINSON
BY Moody and Kintzinger
ATTORNEYS United States Patent Office 3,182,261
Patented May 4, 1965

3,182,261

SSB-FM DETECTOR

Samuel L. Broadhead, Jr., and Dennis L. Fredrickson, Cedar Rapids, and Russell G. Vinson, Marion, Iowa, assignors to Collins Radio Company, Cedar Rapids, Iowa, a corporation of Iowa Filed Jan. 21, 1963, Ser. No. 252,790
11 Claims. (Cl. 325—315)

Figure 1:
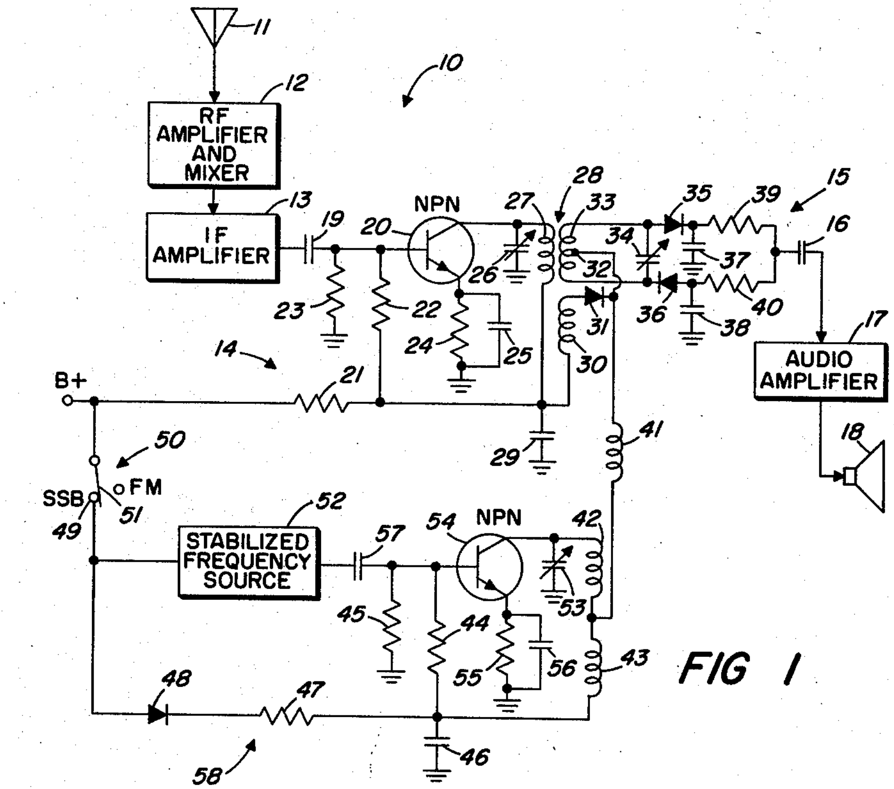

This invention relates in general to audio detecting systems, and in particular to a combined single sideband and FM audio detecting circuit which may be selectively switched to either FM or SSB audio detecting operation as desired.

Many existing communication systems, adapted strictly for the FM mode of operation, have power requirements low enough for acceptable battery operation with manpacked sets even though other system radio receivers and transceivers mounted in vehicles are connected for receiving power from vehicle power supplies. Of course, with communications for exploration teams, field survey work, and military operations, particularly desirable attributes looked for in radio sets include versatility, small size, lightness, ruggedness, low power consumption, and ease of maintenance. Although the conventional FM mode of operation has proven quite useful in many applications, it, by itself, has fallen short in filling needs of groups operating in the field, military and otherwise, in providing the reliability and increased versatility required in short-range transceivers.

Overcrowding of frequency bands has been a problem with heavy use of electronic communications equipment, and with other equipment increasing electronic background noise, the communications problem is increased with electronic interference further limiting the number of frequencies available. Use of SSB with its 3-kc. bandwidth and 10-kc. channel spacings, on the other hand, results in substantially a tenfold increase in channel availability over conventional FM. For example, the 3-kc. bandwidth required for SSB operation makes 5,000 channels available in the 20.00 to 69.99 megacycle range rather than the approximately 500 channels available with conventional FM. Furthermore, selective fading, characteristic of FM on the lower frequency band, does not affect SSB operation, and since the carrier is suppressed in SSB operation, mutual interference problems are reduced. There are other reasons and advantages indicating the advisability of acquiring SSB capabilities. However, there is a problem in making a transition from FM to SSB with various groups and various branches of the military having a heavy capital investment in FM equipment. Thus, it may be required that any use of SSB or transfer to SSB operation be compatible with FM in order that phasing out of FM equipment may be accomplished over a considerable period of time. Furthermore, the increased flexibility of operation with continued compatible SSB-FM operation may be preferred in addition to considerations directed to the heavy capital losses involved in switching modes of operation overnight and eliminating expensive FM equipment.

It is, therefore, a principal object of this invention to provide a radio receiver detecting system readily convertible back and forth between FM and SSB modes of operation merely by a single switching function.

A further object is to provide a dual FM and SSB audio detecting system utilizing common circuitry and components to a great extent in order that radio receivers and transceivers may be more versatile in operation, of small size, light weight, rugged, have low-power requirements, have low-maintenance requirements, and provide for easy efficient repair when required.

Features of this invention useful in accomplishing the above objects, in an alternate function SSB-FM audio detector circuit, include a detector portion, IF amplifier to detector signal transmitting circuitry, and control circuitry with a single switch between B+ voltage supply and a control appendage with the switch having two positions connecting and disconnecting the appendage from B+ voltage for the SSB and FM modes of operation, respectively. A transformer provides for coupling IF output signals to a balanced secondary coil having a center tap, and a quadrature voltage signal coupling secondary coil is connected through a diode to the center tap of the balanced secondary coil. When the dual function control switch is thrown to the FM position, although B+ voltage is not supplied to the appendage, it is supplied to a voltage dividing resistive network from which a voltage potential is applied through the quadrature voltage coupling secondary coil to the anode of the diode. This voltage is sufficient for biasing the diode to conduction for passing quadrature voltage signals to the center tap of the balanced secondary coil with a D.C. diode biasing current path to ground passing through two coils and two resistors of the control appendage. When the switch is thrown to the SSB position, the same two control appendage resistors, along with a third resistor and a second diode, form a voltage dividing network developing a reverse bias at the quadrature voltage passing diode and blocking passage of quadrature voltage signals through the diode. Simultaneously, B+ voltage is applied to a stabilized frequency source in the control appendage and the resulting frequency is applied through an appendage transistor and additional components to the center tap of the balanced secondary coil as a SSB carrier reinsertion frequency for the detector operating in the SSB mode.

Specific embodiments representing what are presently regarded as the best modes of carrying out the invention are illustrated in the accompanying drawings.

Figure 2:
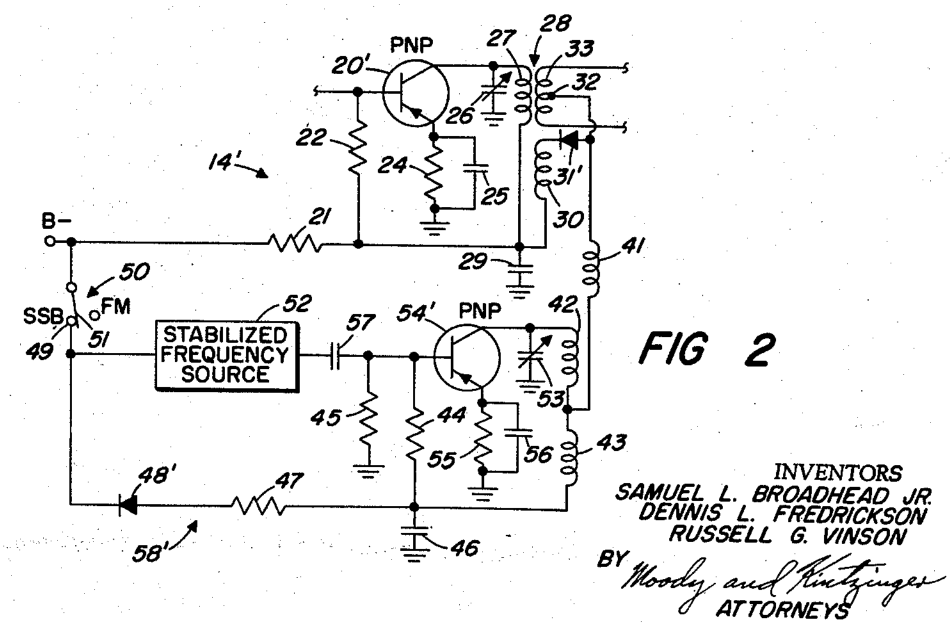

In the drawings:

FIGURE 1 represents a radio receiver including a detailed schematic of an alternate function SSB-FM detector and the alternate function detector control circuitry; and FIGURE 2, an alternate function SSB-FM detector control circuit similar to the corresponding circuitry of FIGURE 1, with, however, PNP transistors replacing NPN transistors, a minus voltage supply in place of the B+ voltage supply, and with two diodes reversed.

Referring to the drawings:

The radio receiver 10 of FIGURE 1 receives an RF signal from antenna 11 which is fed to RF amplifier and mixer 12. The output from RF amplifier and mixer 12 is passed to IF amplifier 13. The output of IF amplifier 13 is passed to alternate function SSB-FM control circuit 14, and ultimately to detector 15 for SSB or FM operation as determined by the control setting of the alternate function control circuit 14. The detected signal output of detector 15 is passed through capacitor 16 and audio amplifier 17 to speaker 18.

Referring to alternate function SSB-FM control circuit 14 in detail, the IF signal from amplifier 13 is passed through capacitor 19 to the base of NPN transistor 20. The junction of capacitor 19 and the base of transistor 20 is connected to the B+ voltage supply serially through resistors 21 and 22 and to ground through resistor 23. The emitter of transistor 20 is connected through resistor 24 and capacitor 25 in parallel to ground. The collector of transistor 20 is connected through variable capacitor 26 to ground, and serially through the primary coil 27 of coupling transformer 28 and capacitor 29 to ground. The junction of primary coil 27 and capacitor 29 is connected to the junction of resistors 21 and 22 and through resistor 21 to B+ voltage supply, and is also connected through transformer secondary coil 30 and diode 31 to the center tap 32 of center tapped secondary coil 33. This provides the FM quadrature voltage path to the balanced detector (discriminator) 15 when diode 31 is forwardly biased to conduction.

Detector (discriminator) 15 includes a variable capacitor 34, connected across the opposite ends of center tapped secondary coil 33, diode 35, with the anode connected to one end of secondary coil 33, diode 36, with its cathode connected to the other end of the secondary coil 33. The cathode of diode 35 is connected through capacitor 37 to ground, and the anode of diode 36 is connected through capacitor 38 to ground. These are also interconnected through resistors 39 and 40, and, at the junction of resistors 39 and 40, through capacitor 16 to audio amplifier 17.

The junction of the cathode of diode 31 and the secondary coil center tap 32 is connected through coil 41 to the junction of coils 42 and 43. The other end of coil 43 is connected serially through resistors 44 and 45 to ground, through capacitor 46 to ground, and serially through resistor 47 and diode 48 to the SSB terminal 49 of switch 50, and through the switch to B+ supply when movable switch arm 51 is in contact with the SSB terminal 49. Diode 48 is connected, cathode to resistor 47 and anode to switch terminal 49, to prevent backflow of current to the input of a stabilized frequency source 52 (one of various available oscillator frequency generators) connected to the junction of the anode of diode 48 and switch SSB terminal 49. The other end of coil 42 is connected through variable capacitor 53 to ground and to the collector of NPN transistor 54. The emitter of transistor 54 is connected through resistor 55 and capacitor 56 in parallel to ground. The base of transistor 54 is connected to the junction of resistors 44 and 45, and through capacitor 57 for receiving an output signal from stabilized frequency source 52 when B+ voltage supply is being applied through switch 50 to the stabilized frequency source 52.

In operation, with switch 50 thrown open to the FM position B+ voltage supply is blocked from direct application to the alternate function control appendage 58 of control circuit 14, diode 48 blocks backflow of current, and stabilized frequency source 52 is deactivated from supplying carrier reinsertion frequency. However, with B+ voltage supplied through resistor 21 and coil 30 through diode 31, the diode is properly forwardly biased to a state of conduction with a current path extending to ground through coil 41, coil 42, transistor 54, and resistor 45. A parallel branch handling a much lower current flow through coil 43 and resistor 44, along with the emitter connection through resistor 55 to ground, provides for proper biasing of transistor 54 to conduction. The total current flow through the diode 31 is sufficient for passing quadrature voltages coupled to and transferred from secondary coil 30 through diode 31 to the center tap 32 of secondary coil 33, without clipping, as an input to detector 15 in the FM mode of operation.

With switch arm 51 of switch 50 thrown to the SSB contact terminal B+ voltage supply is applied directly to the alternate control function appendage 58 of control circuit 14. This activates stabilized frequency source 52 for supplying SSB carrier reinsertion frequency through capacitor 57, transistor 54, coil 42, and coil 41 to the center tap of secondary coil 33 as the SSB carrier reinsertion frequency to detector 15 and operation in the SSB mode. With switch 50 thrown to the SSB position B+ voltage is also applied through diode 48 and resistor 47 to the junction of resistor 44 and capacitor 46. This supplies the voltage for biasing transistor 54 to conduction in order that the carrier reinsertion frequency from stabilized frequency source 52 may be transmitted through transistor 54. The voltage potential at the junction of resistors 44 and 47 and capacitor 46 is higher than the voltage potential at the junction of resistors 21 and 22 and capacitor 29 when B+ is applied through switch 50. This voltage potential is applied through coil 43 and coil 41 to reverse bias diode 31 with a higher voltage potential at the cathode of the diode than the voltage potential at the anode. This condition exists because there is a larger voltage drop through resistor 21 of the voltage divider including resistors 21, 22, and 23 than the voltage drop through diode 48 and resistor 47 of the voltage divider including diode 48 and resistors 44, 45, and 47. Thus, radio frequencies received and passed by IF amplifier 13 are coupled to transformer secondary coil 33 and combined with the carrier reinsertion frequency applied at center tap 32 for SSB audio detection by detector (discriminator) 15. Simultaneously, any signal coupled from the primary coil 27 to secondary coil 30 of transformer 28 is blocked from being detected by the reverse biased non-conductive signal blocking state of diode 31.

It should be noted that the value of coil 41 as a choke is a factor in determining relative signal voltage amplitudes between FM and SSB modes of operation applied to detector 15 through center tap 32. Good results have been obtained with the variable capacitor 26 and transformer primary coil 27, transformer secondary coil 33 and variable capacitor 34, and variable capacitor 53 and coil 42 tuned circuits adjusted to resonance at 5 megacycles, and with the stabilized frequency source 52 adjusted to provide a 5 megacycle carrier reinsertion frequency when activated.

Components used in an alternate function SSB-FM detector, as shown in FIGURE 1, with tuned circuits and the stabilized frequency source adjusted to 5 megacycles and using a B+ voltage of 20 volts, include the following:

| | | |
|---|---|---|
| Capacitor 16 | μf | 15 |
| Capacitor 19 | μμf | 160 |
| NPN Transistor 20 | | 2N703 |
| Resistor 21 | ohms | 3.3K |
| Resistor 22 | do | 22K |
| Resistor 23 | do | 3.3K |
| Resistor 24 | do | 560 |
| Capacitor 25 | μf | .01 |
| Variable capacitor 26 | μμf | 150–200 |
| Capacitor 29 | μf | 1 |
| Variable capacitor 34 | μμf | 200–250 |
| Diode 31 | | 1N916 |
| Diode 35 | | FA2000 |
| Diode 36 | | FA2000 |
| Capacitor 37 | μf | .01 |
| Capacitor 38 | μf | .01 |
| Resistor 39 | ohms | 4.7K |
| Resistor 40 | do | 4.7K |
| Choke coil 41 | μh | 100 |
| Resistor 44 | ohms | 2.2K |
| Resistor 45 | ohm | 1K |
| Capacitor 46 | μf | .01 |
| Resitsor 47 | ohms | 220 |
| Diode 48 | | 1N457 |
| Variable capacitor 53 | μμf | 200–250 |
| NPN Transistor 54 | | 2N703 |
| Resistor 55 | ohm | 1K |
| Capacitor 56 | μf | .01 |
| Capacitor 57 | μμf | 10 |

In the embodiment of FIGURE 2, components similar to those of FIGURE 1 are for the sake of convenience numbered the same. In this embodiment, PNP transistors 20′ and 54′ replace the NPN transistors 20 and 54 of FIGURE 1. Diodes 31′ and 48′ are reversed in anode to cathode orientation from the orientation of diodes 31 and 48 in FIGURE 1, and a B− voltage supply is utilized in place of the B+ voltage supply of FIGURE 1. This embodiment, with these changes, provides substantially the same operational results as provided by the embodiment of FIGURE 1.

Whereas this invention is here illustrated and described with respect to several embodiments thereof, it should be realized that various changes may be made without departing from the essential contributions to the art made by the teachings hereof.

We claim:

1. A radio receiver having an alternate function SSB-FM audio detector circuit with a signal input portion; an audio detecting portion; a transformer coil coupling connecting the signal input and audio detecting portions; said transformer coil coupling including a primary coil connected to the signal input portion, a first secondary coil connected to the audio detecting portion, and a second secondary coil connected to both the signal input portion and the audio detecting portion; a voltage supply and a voltage reference connected to said signal input portion; a voltage divider in said signal input portion; unidirectional current transmitting means included in the connection between the second secondary coil and the audio detecting portion; an alternate function SSB-FM control circuit appendage connected to said unidirectional current transmitting means and to said first secondary coil, and having a D.C. path to the voltage reference from the unidirectional current transmitting means; means for controlled switching of said voltage supply on and off from the control circuit appendage for audio detection in the SSB mode when on, and in the FM mode when off; stabilized frequency source means in the control circuit appendage connected for providing a SSB carrier reinsertion frequency when the voltage supply is switched to the appendage; and circuit means for applying a reverse bias voltage to said unidirectional current transmitting means when the voltage supply is switched to the control circuit appendage.

2. The alternate function SSB-FM audio detector of claim 1 wherein, said audio detecting portion has a tuned circuit including said first secondary coil and a capacitor; and with said tuned circuit and the stabilized frequency source tuned to substantially the same frequency.

3. The alternate function SSB-FM audio detector circuit of claim 1 wherein, the unidirectional current transmitting means is a first diode; the circuit means for applying a reverse bias voltage is a D.C. circuit path extending from said means for controlled switching of the voltage supply, and extending through said control circuit appendage to the first diode, and includes a second reverse current blocking diode.

4. The alternate function SSB-FM audio detector circuit of claim 3 wherein, first amplifying means is provided in said signal input portion and second amplifying means is provided in said control circuit appendage; a voltage divider is provided in said appendage; said voltage divider and the appendage voltage divider are connected for applying biasing voltages to said first and second amplifying means, respectively; the input portion voltage divider is connected for applying a voltage potential to an electrode of said first diode; and the appendage voltage divider is connected for applying a voltage potential to the other electrode of said first diode.

5. The alternate function SSB-FM audio detector circuit of claim 4 wherein, said first and second amplifying means are NPN transistors; the anode of said first diode is connected to said second secondary coil and the cathode to both the audio detecting portion and to the control appendage; the anode of the appendage diode is connected to the voltage supply switching means; with the voltage supply being a positive voltage supply; and with the voltage reference being ground.

6. The alternate function SSB-FM audio detector circuit of claim 4 wherein, said first and second amplifying means are PNP transistors; the cathode of said first diode is connected to said second secondary coil and the anode to both the audio detecting portion and to the control appendage; the cathode of the appendage diode is connected to the voltage supply switching means; with the voltage supply being a minus voltage supply; and with the voltage reference being ground.

7. The alternate function SSB-FM audio detector circuit of claim 4 wherein, said first and appendage diodes, and said first and second amplifying means are solid state devices; a first tuned capacitor and coil circuit is connected to the output of said first amplifying means and includes said transformer primary coil; a second tuned capacitor and coil circuit including said first secondary coil is in the audio detecting portion; and a third tuned capacitor and coil circuit is in the control circuit appendage between the output of the second amplifying means and said first secondary coil.

8. The alternate function SSB-FM audio detector circuit of claim 7 with the three tuned circuits and the stabilized frequency source means tuned to substantially the same frequency.

9. The alternate function SSB-FM audio detector of claim 1 wherein, said first secondary coil is a center tapped coil; the audio detecting portion is a balanced detector; and the control circuit appendage is connected to the said first secondary coil at the center tap.

10. The alternate function SSB-FM audio detector circuit of claim 1 wherein, said control circuit appendage includes choke coil means connected to be a factor in determining relative signal voltage amplitudes between FM and SSB modes of operation applied to the audio detector portion.

11. An alternate function SSB-FM audio detector circuit having an audio detecting portion; signal input means; a transformer coupling connecting the signal input means and the audio detecting portion; said transformer including a primary coil, a first secondary coil, and a second secondary coil; a voltage supply; circuit means interconnecting said first and second secondary coils and including unidirectional current transmitting means having a firing to conduction characteristic when forwardly voltage biased above a threshold; a voltage dividing network in said signal input means connected to said voltage supply and said unidirectional current transmitting means; an alternate function SSB-FM control circuit appendage connected to the junction of said unidirectional current transmitting means and the first secondary coil; a switch having two switch positions connected to the voltage supply and to said control circuit appendage, with the switch positions being an open position with the appendage disconnected for the FM mode of operation, and a closed position with the appendage connected for the SSB mode of operation; a stabilized frequency source in said circuit appendage subject to activation and connected for providing a SSB carrier reinsertion frequency from the appendage to said first secondary coil and the audio detecting portion; and voltage biasing means for applying a reverse bias to said unidirectional current transmitting means when said switch is thrown to the closed SSB position.

References Cited by the Examiner

UNITED STATES PATENTS

| | | | |
|---|---|---|---|
| 2,634,367 | 4/53 | Joseph | 329—122 XR |
| 2,871,349 | 1/59 | Shapiro | 329—122 |

OTHER REFERENCES

Booth A.M.: "Transistorized Receiver for Mobile FM," Electronics, pages 158–161, November 1956.

DAVID G. REDINBAUGH, *Primary Examiner.*